United States Patent [19]

Tamegai

[11] Patent Number: 5,138,499

[45] Date of Patent: Aug. 11, 1992

[54] METHOD OF OVERWRITING RECORDED DATA ON MAGNETIC TAPE IN APPARATUS EMPLOYING POSITIONING SIGNALS DERIVED FROM AXIALLY DISPLACED HEADS

[75] Inventor: Masahiro Tamegai, Kodaira, Japan

[73] Assignee: TEAC Corporation, Tokyo, Japan

[21] Appl. No.: 551,768

[22] Filed: Jul. 11, 1990

[30] Foreign Application Priority Data

Jul. 14, 1989 [JP] Japan .................................. 1-182303

[51] Int. Cl.⁵ .............................................. G11B 27/10
[52] U.S. Cl. ........................................ 360/13; 360/60; 360/77.13
[58] Field of Search ............. 360/60, 61, 77.13, 77.14, 360/13

[56] References Cited

U.S. PATENT DOCUMENTS

| | | | |
|---|---|---|---|
| 4,423,441 | 12/1983 | Ozaki et al. | 360/13 |
| 4,768,106 | 8/1988 | Ito et al. | 360/13 |
| 4,912,574 | 3/1990 | Kobayashi et al. | 360/60 |
| 5,055,948 | 10/1991 | Kiyonaga | 360/72.1 |

FOREIGN PATENT DOCUMENTS 62-177701 8/1987 Japan .

Primary Examiner—Aristotelis Psitos
Assistant Examiner—David L. Robertson
Attorney, Agent, or Firm—Woodcock Washburn Kurtz Mackiewicz & Norris

[57] ABSTRACT

A writing method suitable for practice with an apparatus having a rotary head assembly for the storage and retrieval of digital data on and from magnetic tape in cassette form or the like. The rotary head assembly is of the type having a rotary drum to which there are mounted a pair of magnetic read/write heads and a pair of magnetic monitor heads. The read/write heads alternately and overlappingly scan the magnetic tape for creating a series of slanting data tracks thereon. The monitor heads are spaced from the read/write heads not only circumferentially but also axially of the rotary drum for monitoring the data tracks being formed by the read/write heads after they have been overlapped by the subsequently formed tracks. The writing method is of particular utility in writing a block of user data over any selected target group of existing data tracks that have been written on the magnetic tape by another similar magnetic tape apparatus in which the axial distances between the read/write heads and the monitor heads may differ from those of the present apparatus. The block of user data is written over all but the first and last of the target group of existing data tracks, and dummy data is written over the first and the last.

2 Claims, 6 Drawing Sheets

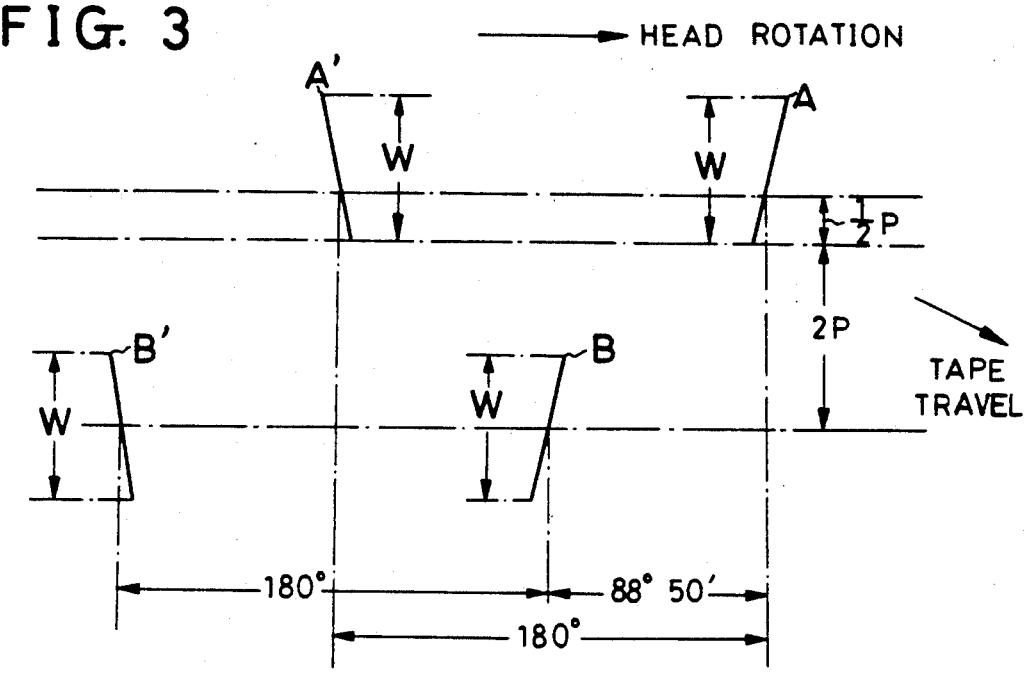
FIG. 3
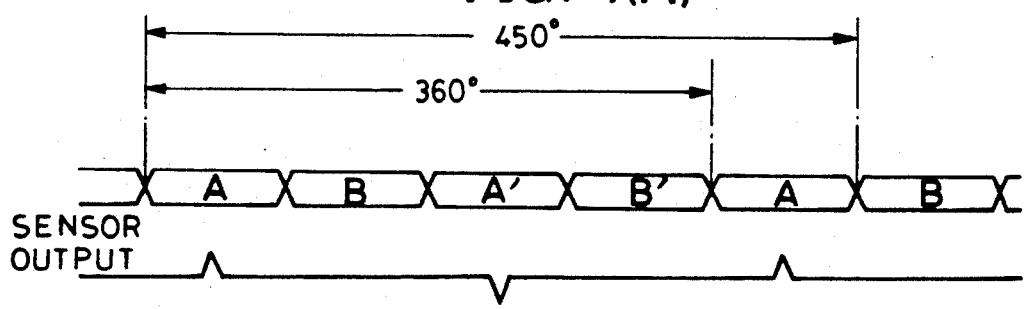
FIG. 4(A)
FIG. 4(B)

METHOD OF OVERWRITING RECORDED DATA ON MAGNETIC TAPE IN APPARATUS EMPLOYING POSITIONING SIGNALS DERIVED FROM AXIALLY DISPLACED HEADS

BACKGROUND OF THE INVENTION

My invention relates to a recording method in magnetic tape data storage and retrieval systems employing a rotary head assembly, such as digital audio tape recorders (DATs) and video tape recorders (VTRs). Typically, the recording method of my invention lends itself to use with those DATs which are adapted for the storage and retrieval of non-audio data, with a read-after-write monitoring capability, for use as external storage devices of computers.

Japanese Unexamined Patent Publication No. 62-177701, laid open to public inspection on Aug. 4, 1987, represents an example of known rotary head magnetic data storage and retrieval system providing for substantially concurrent recording and monitoring of digital data on a tape cassette. It teaches the use of a rotary head assembly including a rotary drum to which there are mounted both a pair of read/write heads and a pair of monitor heads. The pair of read/write heads are disposed in diametrically opposite positions on the rotary drum. The pair of monitor heads are also disposed in diametrically opposite positions on the drum. An angular difference of 90 degrees exists between the positions of the two pairs of heads on the drum.

In this prior art system, as the read/write heads create a series of slanting record tracks on the magnetic tape, the monitor heads substantially concurrently scan the tracks for monitoring the recorded data. In event the output signals of the monitor heads indicate that data is not being recorded properly, the host computer commands the rewriting of the data.

Generally, in rotary head DAT (R-DAT) systems having a substantially concurrent monitoring capability, the pair of read/write heads alternately form tracks so as to overlap the preceding tracks. Such overlapping results in the ultimate creation of record tracks of reduced width. Hereinafter in this specification, and in the claims appended hereto, the term "overwriting" will be used to mean the writing mode wherein the tracks formed by one of the pair of read/write heads lap over the marginal edge portions of the tracks formed by the other. The word "rewriting", on the other hand, will be used to mean the writing of new data on preformed data tracks.

The monitor heads of most conventional R-DAT systems scanned the tracks before they were overwritten. The record tracks eventually formed by overwriting were narrower than those scanned by the monitor heads. Such conventional R-DAT systems enable the nearly simultaneous monitoring of the recordings being made. However, they have often failed to ascertain whether the data is stored on the overwritten tracks with a sufficient quality margin or not. Some data errors on the overwritten tracks present little or no serious problem in DAT decks used for the recording and playback of digitized audio signals. The audio DAT decks are usually equipped to automatically correct such errors during the process of playback to such an extent that the reproduced sound will be practically free from audible distortions. However, recording errors can be fatal in the use of the DAT decks as external storage devices of computer systems.

A known solution to this problem has been a rotary head assembly wherein a pair of read/write heads and a pair of monitor heads are so arranged on a rotary drum that the monitor heads scan the data tracks created by the read/write heads after they have been overwritten. The monitor heads are spaced from the read/write heads not only circumferentially but also axially of the rotary drum. The monitor heads of this known rotary head assembly can be positioned in centerline alignment with the overwritten tracks and so can be utilized for the accurate tracking control of the read/write heads in writing data over the prerecorded tracks.

The prior art rotary head assembly has proved to present certain difficulties unless the read/write heads and the monitor heads are disposed exactly in predetermined positions on the rotary drum. It is difficult, or practically impossible, to meet this requirement in the quanity production of such rotary head assemblies. Some variations in the relative positioning of the read/write heads and monitor heads of such rotary head assemblies are unavoidable within the ranges of the predefined tolerances.

Let us consider a magnetic tape cassette on which data has been written in one DAT deck employing the noted prior art rotary head assembly and which is to be rewritten in another. The read/write heads of the second mentioned DAT deck have often been not positioned in precise centerline alignment with the existing tracks of the tape cassette because of the difference between the relative placements of the read/write heads and monitor heads of the rotary head assemblies in the two DAT decks.

More specifically, if the read/write heads and the monitor heads of the rotary head assembly in the second DAT deck are spaced too much from each other in the axial direction of the rotary drum (i.e. in the transverse direction of the data tracks on the tape), one of the read/write heads have not been positioned to cover the complete width of the first of the target group of existing data tracks to be rewritten. Both old and new data have then come to coexist on this first track, and both data have been read by the associated monitor head. If the read/write heads and the monitor heads are spaced too little, on the other hand, then one of the read/write heads have not been positioned to cover the complete width of the last of the target group of existing tracks. The accuracy of the data read from this last track has been unreliable.

SUMMARY OF THE INVENTION

I have hereby invented how to eliminate the unreliability of data rewritten on the first and the last of any target group of existing data tracks on magnetic tape in an apparatus employing the rotary head assembly of the kind defined.

Briefly, my invention provides a writing method in a magnetic tape apparatus having a rotary head assembly for the storage and retrieval of digital data on and from magnetic tape such as that in the form of a cassette. The rotary head assembly is of the type having a rotary drum on which there are provided a first and a second primary head and a first and a second secondary head. The first and the second primary head have opposite azimuths and alternately scan the magnetic tape for creating a series of slanting data tracks thereon, with each primary head overwriting the preceding data track formed by the other primary head. The first and the second secondary head are displaced from the first and the second primary head both circumferentially and axially of the rotary drum for monitoring the data written on the overwritten tracks formed by the first and the second primary head, respectively.

The writing method of my invention is of particular utility in writing a block of user data over any selected target group of existing data tracks that have been written on the magnetic tape by another magnetic tape apparatus similar to the one outlined above. According to the method of my invention, the first or the second primary head of the rotary head assembly is first positioned on the first of the target group of existing data tracks on the magnetic tape by the tracking control of the first or the second secondary head. Then dummy data such as that representative of binary zero is written over the first of the target group of existing data tracks on the magnetic tape. Then the block of user data is sequentially written over all but the first and last of the target group of existing data tracks. Then additional dummy data is written over the last of the target group of existing data tracks.

Thus, according to my invention, the unreliability of data recorded on, and recovered from, the first and last of any target group of existing data tracks on the magnetic tape is overcome by not writing user data on such tracks. The dummy data written instead on such tracks has, of course, an azimuth opposite to that of the data recorded on the adjoining tracks, so that the dummy data does not decrease the reliability of the user data retrieved from the adjoining tracks.

The above and other features and advantages of my invention and the manner of realizing them will become more apparent, and the invention itself will best be understood, from a study of the following description and appended claims, with reference had to the attached drawings showing a preferred mode of carrying out my invention.

BRIEF DESCRIPTION OF THE DRAWINGS

FIG. 3 is a developed view explanatory of the angular and circumferential positions of the read/write heads and monitor heads on the rotary drum in the rotary head assembly;

FIGS. 4(A) and 4(B) are a schematic illustration of how the read/write heads and monitor heads scan the magnetic tape, and of how a head position sensor generates a series of alternating positive and negative pulses indicative of the positions of the heads of the rotary head assembly;

DETAILED DESCRIPTION OF THE INVENTION

Figure 1:
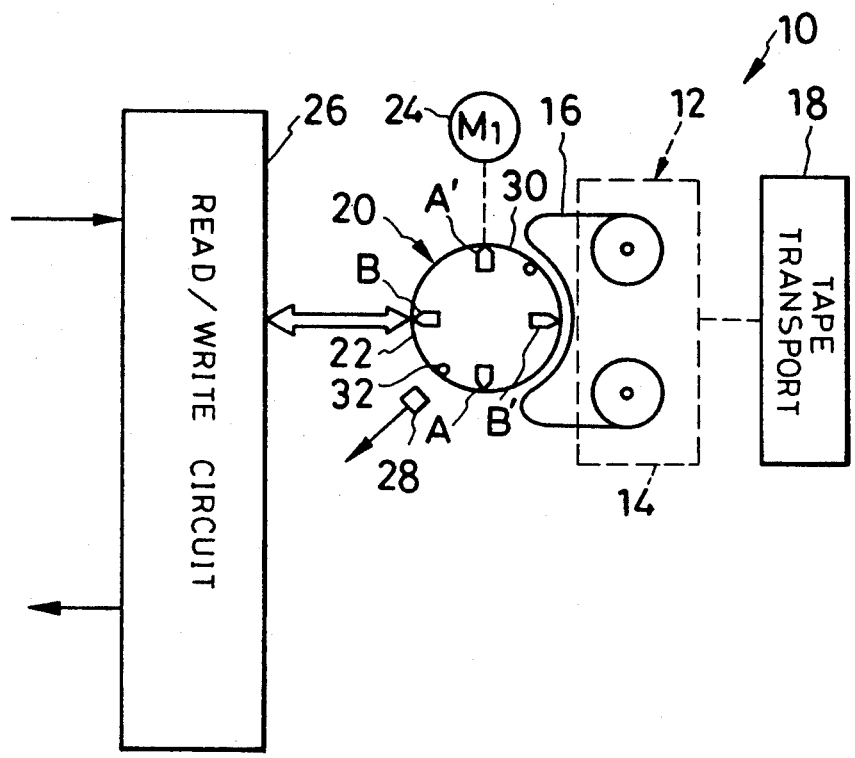
FIG. 1 is a schematic diagram, partly in block form, of the R-DAT deck suitable for use in carrying out the method of my invention.

I will now describe the recording method of my invention in detail in an environment of an R-DAT deck adapted for use as an external storage device of a computer. Although the showing of FIG. 1 is highly diagrammatic, it will nevertheless be seen that the illustrated R-DAT deck 10 is for use with a replaceable DAT cassette 12 of standard construction having a generally flat, boxlike housing 14 with a length of magnetic tape 16 received therein. The R-DAT deck 10 has a tape transport 18 for transporting the tape 16 from hub to hub within the cassette housing 14. I have shown the tape transport 18 in the form of a block as it can be of any known or suitable construction. Typically, the tape transport 18 may comprise a capstan, a capstan motor, a pinch roller, and a pair of hub motors, which are all familiar to the specialists.

Disposed for data transfer with the magnetic tape 16 of the DAT cassette 12 is a rotary head assembly 20 having the construction set forth in connection with the prior art. The rotary head assembly 20 comprises a rotary drum 22 to which there are mounted first A and second A' magnetic read/write heads and first B and second B' magnetic monitor heads.

I have called the read/write heads A and A' so in conformity with conventional terminology. According to our invention, however, the read/write heads are required only to write data on the DAT cassette 12, the reading of the data being possible by the monitor heads B and B', even though the read/write heads may be utilized for reading, too. I will therefore refer to the first and second read/write heads A and A' as the first and second primary heads, and to the first and second monitor heads B and B' as the first and second secondary heads, respectively, as these terms are believed to more aptly describe the heads taken in their broader aspects.

The two primary heads A and A' are disposed in diametrically opposite positions on the rotary drum 22, and so are the two secondary heads B and B'. An angular spacing of 88°50' exists between the positions of the primary heads A and A' and those of the secondary heads B and B'. An electric drum motor 24 is drivingly coupled to the rotary drum 22 for imparting rotation thereto.

A read/write circuit 26 is electrically connected to the primary heads A and A' and the secondary heads B and B'. This read/write circuit is conventionally under the control of a host computer, not shown. I will later detail the construction and operation of the read/write circuit 26.

Figure 2:
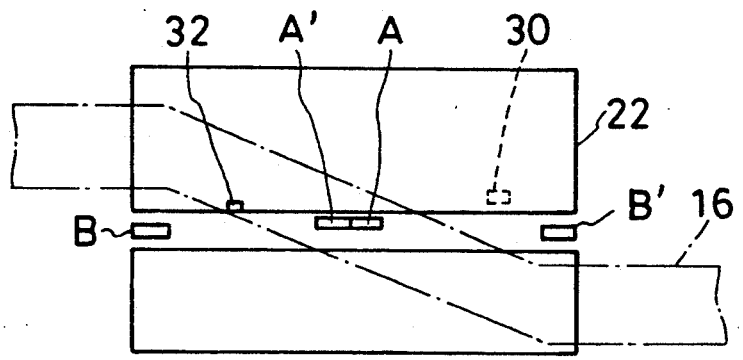
FIG. 2 is a diagrammatic illustration explanatory of the positional relationship between the read/write heads and monitor heads of the rotary head assembly and the magnetic tape traveling past the same in the R-DAT deck of FIG. 1.

FIG. 2 is explanatory of the positions of the four heads A, A', B and B' on the rotary drum 22 with respect to the magnetic tape 16. The secondary heads B and B' scan the data tracks created by the primary heads A and A', respectively, after the tracks have been overwritten, instead of just as the tracks are formed by the primary heads. Thus a prescribed difference exists between the axial positions of the primary heads A and A' and those of the secondary heads B and B' on the rotary drum 22.

FIG. 3 is explanatory of the axial positions of the four heads A, A', B and B' on the rotary drum 22 and of the azimuths of the gaps in their magnetic cores. I have indicated the four heads by the thicker lines in this figure, and the azimuths of the heads by the inclinations of the thicker lines. It will therefore be understood that the two primary heads A and A' have opposite azimuths, and so do the two secondary heads B and B'. The first primary head A and the first secondary head B have the same azimuth, and so do the second primary head A' and the second secondary head B'.

It will also be noted from FIG. 3 that the four heads A, A', B and B' provide the same original track width W of, say, 22.0 micrometers. Of course, the pitch or width P of the overwritten tracks is less than the original track width W, being normally 13.6 micrometers. Preferably, the original track width W should be less than twice the overwritten track pitch P. The centers of the secondary heads B and B' are spaced twice the overwritten track pitch P from the bottom extremities, as viewed in FIG. 3, of the primary heads A and A' in the axial direction of the rotary drum 22.

Partly pulled out of the cassette housing 14, the magnetic tape 16 is wrapped around the rotary head assembly 20 through an angle of approximately 90 degrees. During each revolution of the rotary drum 22 the four magnetic heads thereon scan the tape each through an angle of 90 degrees in the sequence of the first primary head A, first secondary head B, second primary head A', and second secondary head B', as indicated at (A) in FIG. 4.

Shown at (B) in FIG. 4 is the output signal of a head position sensor seen at 28 in FIG. 1. The head position sensor 28 may take the form of a Hall effect element disposed adjacent the path of a north seeking magnetic pole 30 and a south seeking magnetic pole 32 disposed in diametrically opposite positions on the rotary drum 22. Accordingly, with the rotation of the rotary drum 22, the Hall effect element 28 generates an series of alternating positive and negative pulses indicative of the angular positions of the magnetic poles 30 and 32 on the drum and, therefore, of the four magnetic heads A, A', B and B' thereon.

What must be pointed out in connection with the rotary head assembly 20 is that the arrangement of the four magnetic heads on the rotary drum 22 is such that each of the primary heads A and A' overwrites the data tracks formed by the other primary head, and that the secondary heads B and B' scan the tracks created by the primary heads A and A', respectively, after they have been overwritten. The first secondary head B starts reading each track created by the first primary head A when the rotary drum 22 rotates 450 degrees after the first primary head has started writing the track. Similarly, the second secondary track B' starts reading each track created by the second primary head A' when the rotary drum 22 rotates 450 degrees after the second primary head has started writing the track. Since the tracks formed by the primary heads have been overwritten by the time the rotary drum rotates 450 degrees, the secondary heads scan such overwritten tracks.

Figure 5:
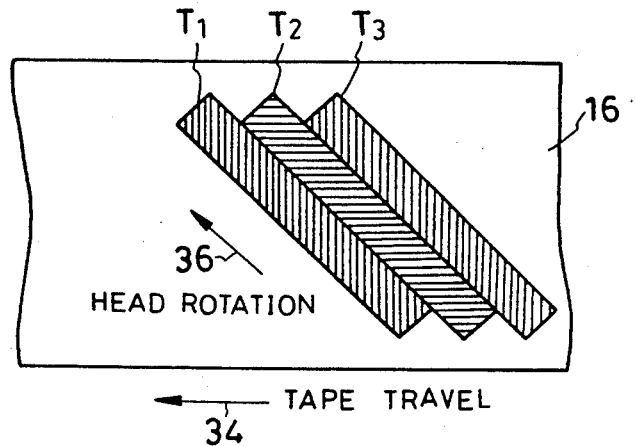
FIG. 5 is a partial diagrammatic illustration of the magnetic tape and the slanting data tracks thereon.

FIG. 5 is an illustration of a series of slanting data tracks $T_1, T_2, T_3, \ldots$ formed on the magnetic tape 16 by the two primary heads A and A'. The first primary head A creates, for example, the tracks $T_1$, $T_3$, etc., and the second primary head A' creates the track $T_2$, etc., as the magnetic tape 16, conventionally wrapped around the rotary drum 22, travels in the direction of the arrow 34 and as the primary heads revolve in the direction of the arrow 36. All the data tracks are disposed contiguously by overwriting, but there is no fear of crosstalk because of the different azimuths of the two primary heads A and A'.

Figure 6:
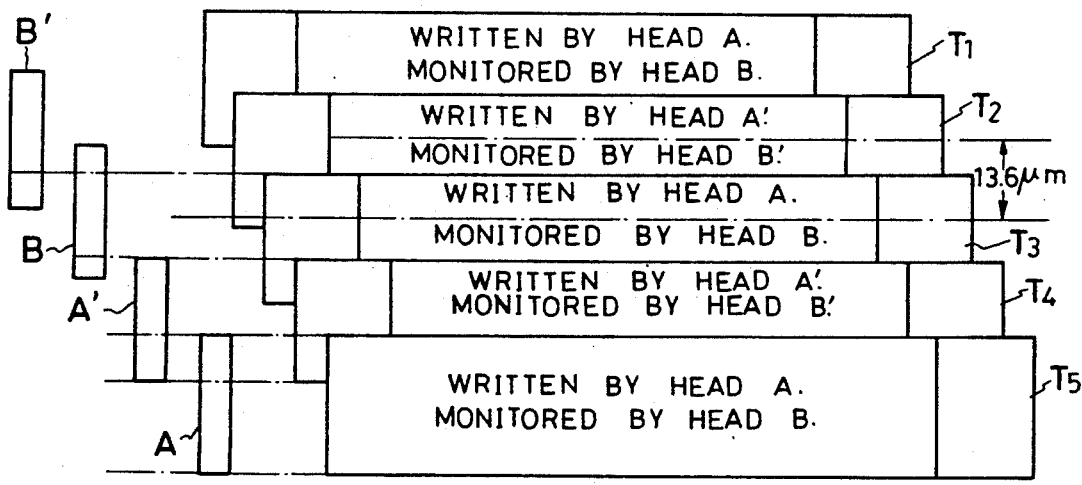
FIG. 6 is a partial schematic illustration explanatory of how the overwritten data tracks are created by the two read/write heads and how they are monitored by the two monitor heads.

With the slanting data tracks of FIG. 5 in mind, let us more closely study the relationship between the tracks and the four heads A, A', B and B' of the rotary head assembly 20. As schematically illustrated in FIG. 6, the first secondary head B is so positioned on the rotary drum 22 as to be in centerline alignment with the successive overwritten tracks $T_1$, $T_3$, etc., created by the first primary head A. The second secondary head B' is so positioned on the rotary drum 22 as to be in centerline alignment with the successive overwritten tracks $T_2$, $T_4$, etc., created by the second primary head A'. Incidentally, the track $T_5$ in FIG. 6 is created by the first primary head A but is shown not yet overwritten. Thus the first and second secondary heads B and B' can read the data on the overwritten tracks formed by the first and second primary heads A and A', respectively.

The above relative arrangement of the primary heads A and A' and the secondary head B and B' offers an additional advantage in connection with the rewriting of data on the magnetic tape 16. The primary heads can be positioned on desired tracks, where the data is to be rewritten, through tracking control of the secondary heads.

Suppose for example that the data on the track $T_3$ in FIG. 6 is to be rewritten. The first primary head A will be correctly positioned on the track $T_3$ if the first secondary head B is positioned in centerline alignment with the track $T_1$. The subsequent rewriting on the track $T_3$ will result in the destruction of the data on the next track $T_4$. It is therefore desirable that the following tracks $T_4$, $T_5$, etc., be rewritten successively. Usually, data is recorded in the form of discrete blocks, with intervening unrecorded regions referred to as gaps, and is rewritten block by block.

Figure 7:
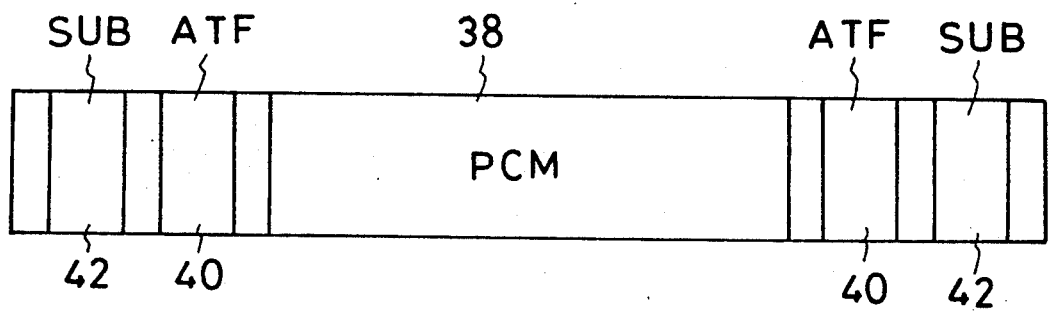
FIG. 7 is a schematic illustration of the normal recording format on each data track of the magnetic tape employed by the FIG. 1 R-DAT system.

FIG. 7 is explanatory of the standard format in which data is recorded on the magnetic tape 16. Each data track on the tape is divided into a central PCM zone 38, a pair of auto track finding (ATF) zones 40 on both sides of the PCM zone, and a pair of subcode zones 42 on the outer sides of the ATF zones. The PCM zones 38 are for the recording of user data in the form of blocks with intervening gaps. The ATF zones 40 are for the recording of tracking signals. The subcode zones 42 are for the recording of program numbers, time code, etc.

Figure 8:
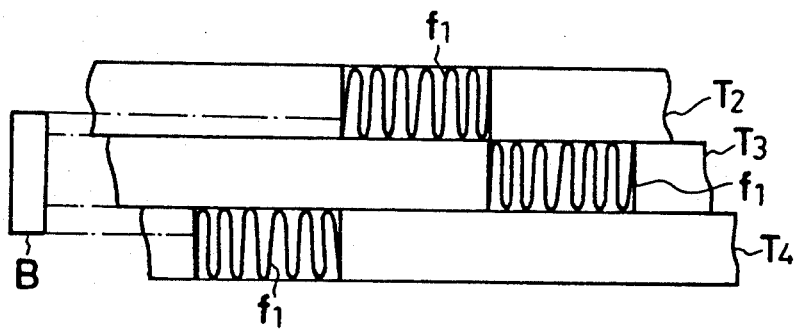
FIG. 8 is a partial schematic illustration of how the monitor heads read the tracking data on the magnetic tape.

Reference may be had to FIG. 8 for a discussion of how the secondary heads B and B' are positioned in centerline alignment with desired overwritten tracks. Let us assume that the first secondary head B is to be positioned in centerline alignment with the track $T_3$. The first secondary head B must read the tracking signals $f_1$ recorded on the ATF zones 40 of the neighboring tracks $T_2$ and $T_4$. The tracking signals from the two neighboring tracks are compared with each other. The first secondary head B can be positioned in centerline alignement with the track $T_3$ as its position is controlled so as to zero the difference between the two tracking signals.

The recordings on the tracks $T_2$ and $T_4$ and those on the track $T_3$ have been made by the primary heads A and A' of opposite azimuths. The tracking signals $f_1$ will nevertheless be read correctly from such adjoining tracks as their frequency is as low as, say, 130 kilohertz. The second secondary head B' can be positioned on any desired track in a like manner.

Figure 9:
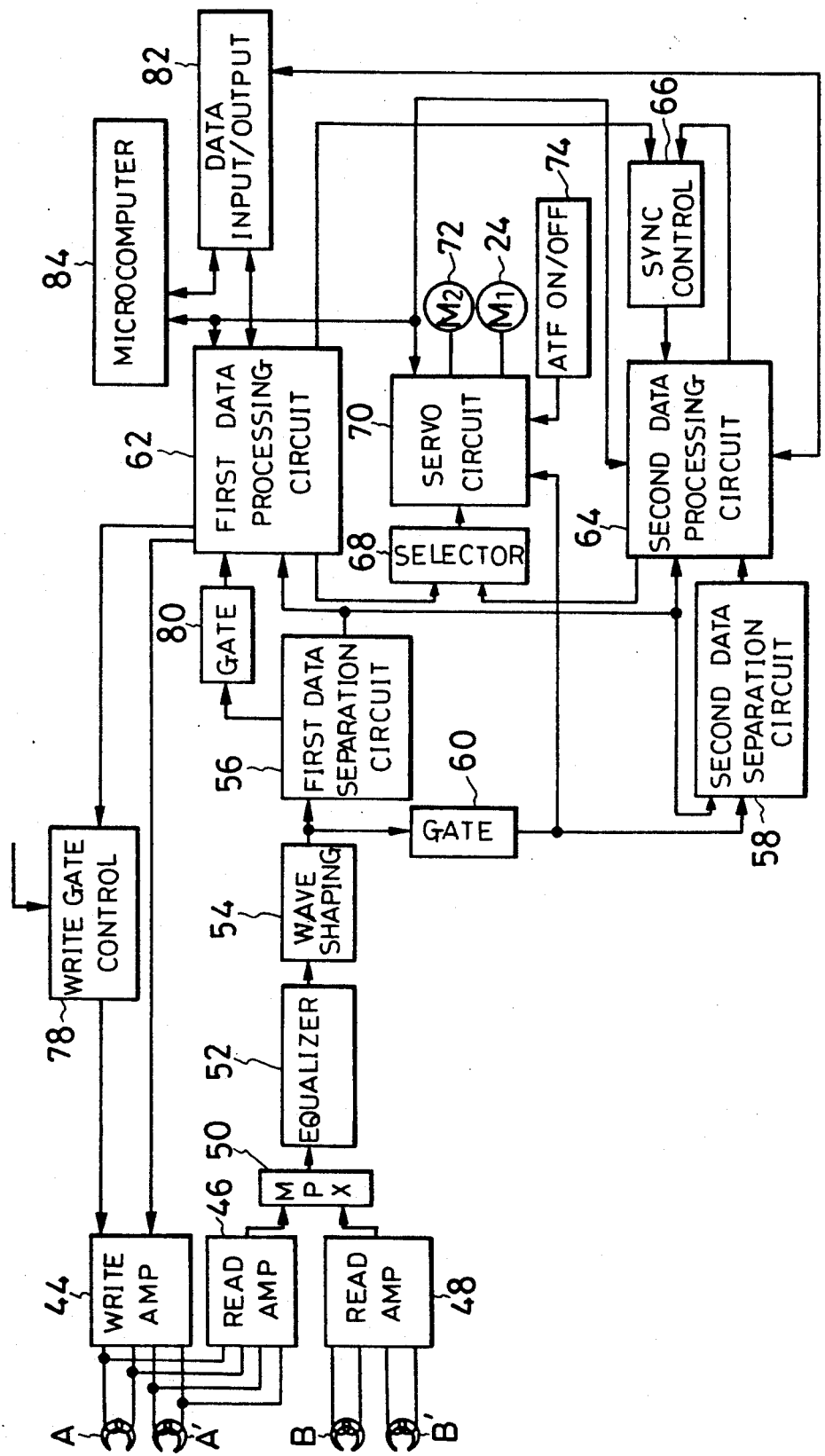
FIG. 9 is a block diagram showing the read/write head of the FIG. 1 R-DAT deck in more detail.

FIG. 9 is a detailed illustration of the read/write circuit 26, FIG. 1, of the R-DAT deck 10. The primary heads A and A' of the rotary head assembly 20 are individually connected to both a write amplifier circuit 44 and a read amplifier circuit 46. The secondary heads B and B' are connected to an additional amplifier circuit 48. I understand that the read amplifier circuit 46 comprises two amplifiers for amplifying the outputs from the two primary heads A and A' and is further configured to alternately produce the amplified outputs therefrom. The other read amplifier circuit 48 likewise comprises two amplifiers and alternately produces the amplified outputs from the two secondary heads B and B'.

The two read amplifier circuits 46 and 48 are both connected to a multiplexer 50. This multiplexer functions to interleave the outputs from both amplifier circuits 46 and 48 and to produce the resulting time division multiplex signal during system operation in the write mode. In the read mode, on the other hand, the multiplexer 50 operates to choose the output from the read amplifier circuit 48.

The multiplexer 50 is connected to an equalizing amplifier 52 and thence to a wave shaping circuit 54. The latter circuit 54 modifies the equalized signal into a binary digital signal.

The wave shaping circuit 54 is connected directly to a first data separation circuit 56 on one hand and, on the other hand, to a second data separation circuit 58 via a gate circuit 60. The first data separation circuit 56 functions to separate the read data from the incoming signal, for delivery to a first data processing circuit 62, besides generating a timing clock signal based on the input signal. The first data processing circuit 62 performs the various conventional data processing functions required by the R-DAT format, for the reading and writing of PCM data and subcode, for the correction of errors, etc.

The gate circuit 60 permits the passage therethrough of only those parts of the output from the wave shaping circuit 54 which represent the outputs from the two secondary heads B and B'. The second data separation circuit 58 inputs both the output from the gate circuit 60 and the timing clock signal from the first data separation circuit 56, for deriving the servo data from the gate circuit output.

A second data processing circuit 64 processes the output from the second data separation circuit 58 to perform various functions such as, principally, demodulation, error detection and correction. This circuit 64 generates various error flags including parity error flags and incorrectability flags.

A sync control circuit 66 have inputs connected to both first and second data processing circuits 62 and 64, and an output connected to the second data processing circuit. The sync control circuit 66 causes operation of the second data processing circuit 64 with a phase lag equivalent to 90 degrees of rotation of the rotary drum 22 with respect to the first data processing circuit 62.

The first and second data processing circuits 62 and 64 are both connected via a selector 68 to a servo circuit 70 which controls both the drum motor 24 and a capstan motor 72. The gate circuit 60 and an ATF on/off circuit 74 are also connected to the servo circuit 70. The ATF on/off circuit 74 determines whether tape speed is to be controlled by ATF servo or to be maintained at a predetermined speed. The servo circuit 70 controls the speed and phase of rotation of the drum motor 24 and the speed of the capstan motor 72 in response to the outputs from the gate circuit 60, selector 68 and ATF on/off circuit 74. Also, during operation in the ATF mode, the servo circuit 70 controls the capstan motor 72 for ATF tracking. Additional functions of the servo circuit 70 include the control of the driving of the cassette hubs and of the fast forwarding of the tape.

Connected between the first data processing circuit 62 and the write amplifier circuit 44, a write gate control circuit 78 determines whether all or part of the write data put out by the first data processing circuit is to be recorded, and makes necessary on-off control of the first data processing circuit output accordingly.

A gate circuit 80 is connected between first data separation circuit 56 and first data processing circuit 62 for the delivery of only the required data from the former to the latter. A data input/output circuit 82 controls the input and output of data to and from the first and second data processing circuits 62 and 64. A microcomputer 84 controls the first and second data processing circuits 62 and 64, servo circuit 70, and data input/output circuit 82.

I will now proceed to the description of operation of the R-DAT deck 10 of the foregoing construction, including the disclosure of the writing method of my invention.

There are three different modes in which information may be written on the DAT cassette 12 by the R-DAT deck 10. These are the formatting mode, the normal writing mode, and the rewriting mode. The formatting mode, in which the cassette tape 16 is formatted as shown in FIG. 7, does not require tracking control based on the outputs from the secondary head B and B'. Such tracking control is effected during the subsequent normal writing mode and rewriting mode. Also, in these normal writing and rewriting modes, the primary heads A and A' are used as read heads for addressing the tracks on the tape 16. The multiplexer 50 of the read/write circuit 26 produces a time division multiplex signal of the primary heads output signals representative of the data from the PCM zones 38 and subcode zones 42 of the tape tracks, and of the secondary heads output signals representative of the data from the ATF zones 40.

The R-DAT deck 10 also performs the read-after-write monitoring of the data on the tape 16 during system operation in the normal writing and rewriting modes. As will be seen by referring again to FIG. 6, the secondary heads B and B' scan the tracks on which data has been written by the primary heads A and A', after one complete revolution of the rotary drum 22. Each track scanned by the primary heads A and A' has been overwritten by the following track after one complete revolution of the rotary drum 22. The secondary heads B and B' scan such overwritten tracks. Accordingly, the secondary heads B and B' read the data under the same conditions as the primary heads A and A' read the data for its retrieval from the DAT cassette 12.

It will also be noted that the secondary heads B and B' can accurately read the ATF servo data on the magnetic tape 16 for exact tracking control of the primary heads A and A'. This is because, first, the secondary heads are so arranged on the rotary drum 22 as to be in centerline alignment with the overwritten tracks and, second, the scanning width W of each secondary head is greater than the width of each overwritten track.

Figure 10:
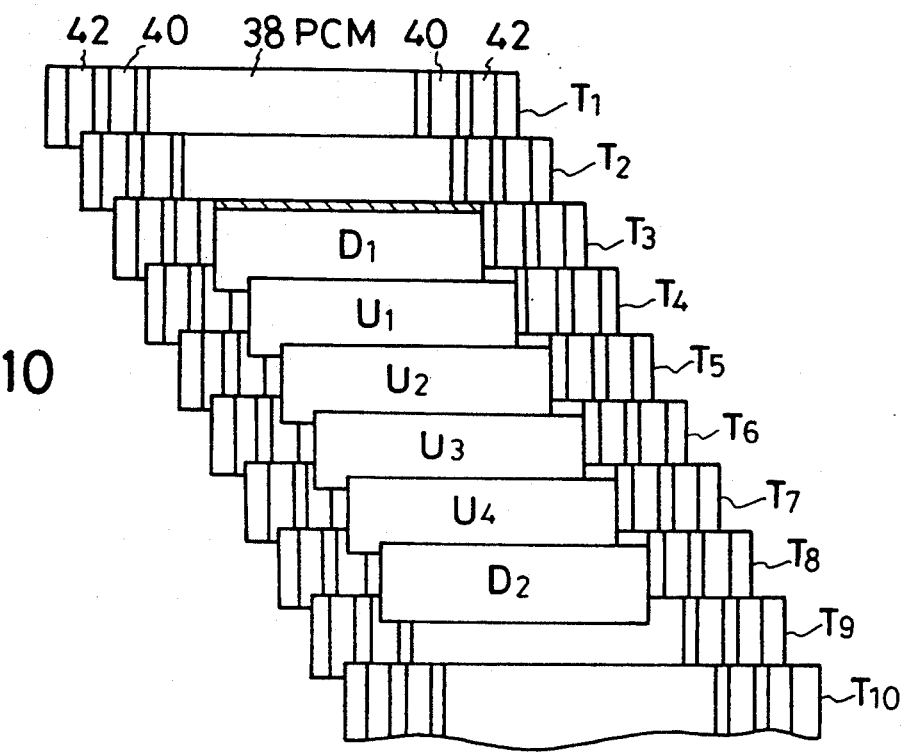
FIG. 10 is a partial schematic illustration of how user data is recorded on a target group of existing data tracks on the magnetic tape by the method of my invention in the case where the read/write heads and the monitor heads are spaced more than a predetermined value in the axial direction of the rotary drum.
Figure 11:
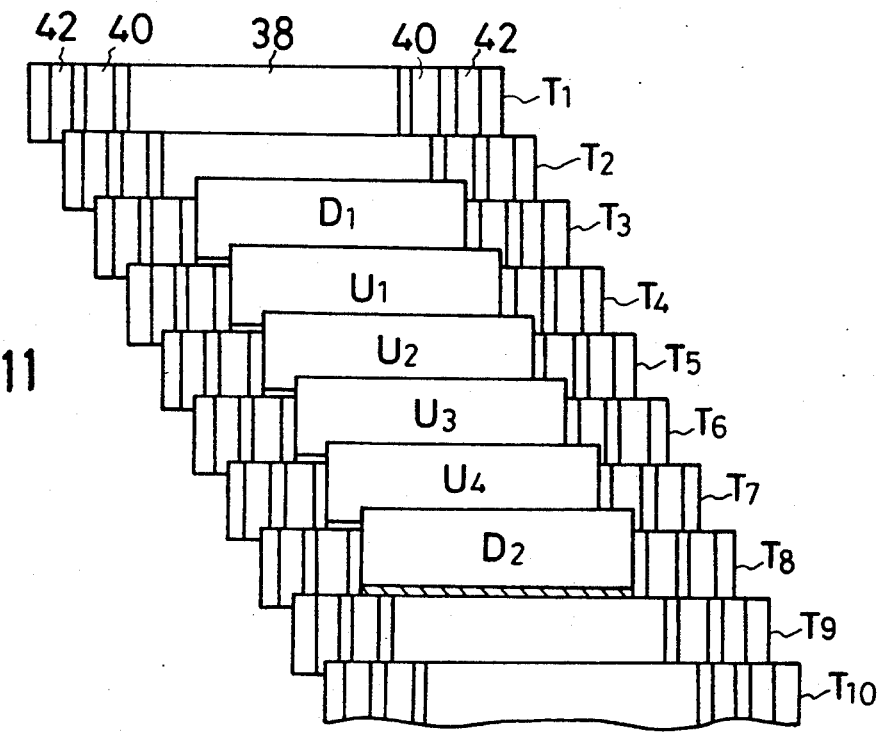
FIG. 11 is an illustration similar to FIG. 10 but explanatory of the case where the read/write heads and the monitor heads are spaced less than the predetermined value in the axial direction of the rotary head.

My invention particularly concerns the rewriting mode, in which data is written on tracks where data has been prerecorded. Let us suppose that a group of tracks $T_3-T_8$ in FIGS. 10 and 11 are to be rewritten. In that case, according to the method of my invention, dummy data $D_1$ and $D_2$ is written on the first track $T_3$ and last track $T_8$ of the target track group $T_3-T_8$, and the desired user data $U_1-U_4$ is written on the remaining tracks $T_4-T_7$. Both dummy data $D_1$ and $D_2$ and user data $U_1-T_4$ may be written only on the PCM zones 38 of the required tracks. I recommend that the dummy data be that representative of binary zero.

For rewriting the track $T_3$ by the first primary head A of the R-DAT deck 10, the first secondary head B may be positioned on the first track $T_1$ through tracking control utilizing the ATF zone 40. Even if the track $T_1-T_{10}, \ldots$ have been formed by some other R-DAT deck, the first primary head A will be positioned exactly on the third track $T_3$, provided that the spacings between the primary heads A and A' and the secondary heads B and B' are the same in this and that other R-DAT decks.

Possibly, however, the spacings between the primary and the secondary heads may be greater in this R-DAT deck. Then the first primary head A will not be positioned exactly on the old track $T_3$ and will leave the hatched area of FIG. 10 unscanned. This will cause no inconvenience whatsoever as the first primary head A writes the dummy data $D_1$ on the new third track, which, incidentally, is somewhat displaced from the old third track. The dummy data $D_1$ will be written on part of the old fourth track $T_4$. Consequently, when the new user data $U_1$ is subsequently written on the fourth track $T_4$, no old data of the same azimuth will be left contiguous to the new user data. The dummy data $D_1$ and the new user data $U_1$ are of the opposite azimuths, so that the dummy data will not interfere in any way with the subsequent retrieval of the new user data.

It is also possible that the spacings between the primary and the secondary heads may be less in this R-DAT deck than in the other by which the old data tracks have been formed on the tape cassette 12. Then the dummy data $D_1$ will be written in part on the old data track $T_2$, as indicated in FIG. 11. Thus, although no part of the old track $T_3$ will be left unscanned, the old track $T_8$ (the last of the target track group $T_3-T_8$) will be partly left unscanned, as indicated by the hatching in FIG. 11. Only the dummy data $D_2$ is written on the track $T_8$, however, so that any old data remaining at the hatched unscanned area will present no problem at all.

It is by the first signal processing circuit 62 and microcomputer 84 that the dummy data $D_1$ and $D_2$ are prepared and arranged before and after each block of user data $U_1-U_4$ when the writing of the user data block is requested by the data input/output circuit 82. Then the dummy data and user data may be written on the tracks $T_3-T_8$ in the sequence of FIGS. 10 and 11.

For data retrieval from the DAT cassette 12, the outputs from only the secondary heads B and B' are derived by the multiplexer 50. Data is recovered from the PCM zones 38 and subcode zones 42 of the data tracks, with the necessary tracking control effected by reading the tracking data $f_1$ of FIG. 8.

Although I have shown and described my invention in highly specific aspects thereof and as embodied in an R-DAT deck adapted for use as an external storage device of a digital computer, I do not wish my invention to be limited by the exact details of this disclosure. A variety of modifications, alterations and adaptations of the teachings hereof may be resorted to by one skilled in the art within the broad teaching hereof. For example, the primary and secondary heads could be so arranged on the rotary drum that the secondary heads scan the tracks spaced any even number other than two from the tracks being traced by the primary heads. It will also be apparent that the primary heads, instead of the secondary heads, might be used for the retrieval of information.

What I claim is:

1. In a magnetic tape apparatus having a rotary head assembly for the storage and retrieval of digital data on and from magnetic tape such as that in the form of a cassette, the rotary head assembly having a rotary drum on which there are provided a first and a second primary head and a first and a second secondary head, the first and the second primary head having opposite azimuths and alternately scanning the magnetic tape for creating a series of slanting data tracks thereon, each primary head overwriting the preceding data track formed by the other primary head, the first and the second secondary head being displaced from the first and the second primary head both circumferentially and axially of the rotary drum for monitoring the data written on the overwritten tracks formed by the first and the second primary head, respectively, a writing method of particular utility in writing a block of user data over any selected target group of existing data tracks that have been written on the magnetic tape by another similar magnetic tape apparatus, which method comprises:

(a) positioning the first or the second primary head of the rotary head assembly on the first of the target group of existing data tracks on the magnetic tape by the tracking control of the first or the second secondary head;

(b) writing dummy data over the first track of the target group of existing data tracks on the magnetic tape;

(c) sequentially writing the block of user data over all but the first and last tracks of the target group of existing data tracks; and (d) writing dummy data over the last track of the target group of existing data tracks.

2. The writing method of claim 1 wherein the dummy data is data representative of binary zero.

* * * * *